March 13, 1956 G. A. KNAPP 2,738,413
VEHICLE LIGHTING DEVICES
Filed March 31, 1953
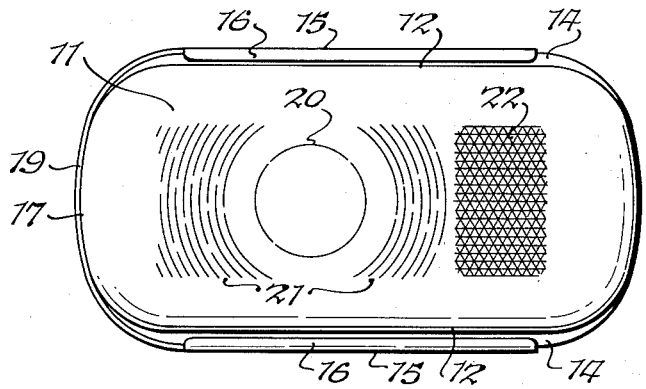
Fig. 1.
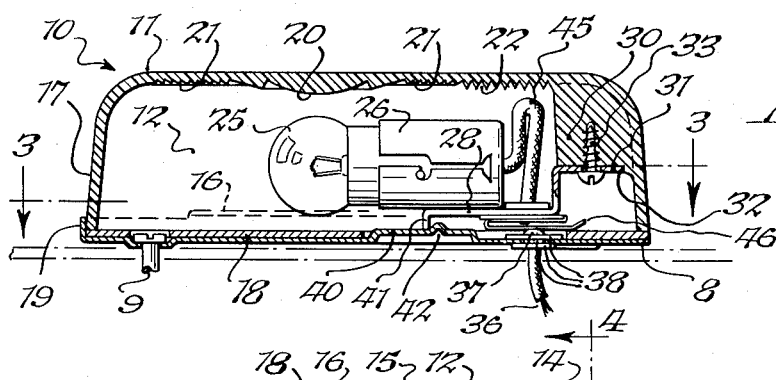
Fig. 2.
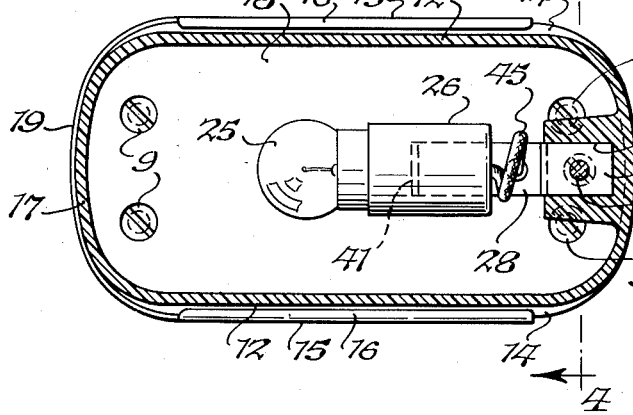
Fig. 3.
Fig. 5.
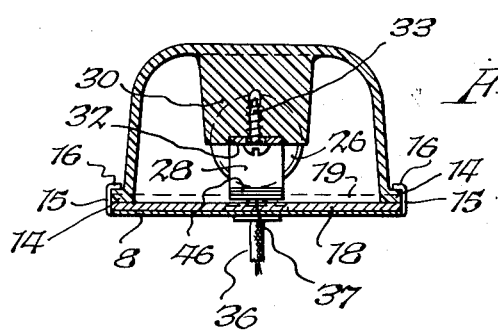
Fig. 4.
INVENTOR,
George A. Knapp
BY
Parker, Proelmor & Farmer,
Attorneys.

Patented Mar. 13, 1956

2,738,413

VEHICLE LIGHTING DEVICES

George A. Knapp, De Witt, N. Y., assignor to R. E. Dietz Company, Syracuse, N. Y.

Application March 31, 1953, Serial No. 345,982

4 Claims. (Cl. 240—7.1)

This invention relates to lighting devices of the general type commonly referred to as marker lights. These lights are generally applied at the sides of a truck, trailer or other vehicle to clearly indicate the limits as to width or length of the vehicle body. These marker lights, consequently, facilitate the maneuvering of the vehicle by its operator and also guide others to prevent collisions with the vehicle carrying the marker lights.

In spite of the provision of marker lights on vehicles, it frequently happens that the sides of vehicles equipped with marker lights come into contact with other vehicles or with fixed objects, so that the marker lights are broken off of the sides of the vehicle and must then be replaced.

One of the objects of this invention is to provide a lighting device provided with a lens member of improved and simplified construction adapted to be secured to a base mounted on the vehicle in such a manner as to be easily removed therefrom and replaced thereon. A further object is to provide a lighting device of this type including a lens member formed of transparent molded material and having a lens portion and a light bulb supporting portion molded integral therewith to enable a light bulb socket to be quickly and accurately mounted on the lens member in optically correct relation to the lens portion thereof.

Other objects and advantages will be apparent from the following description of one embodiment of the invention and the novel features will be particularly pointed out hereinafter in connection with the appended claims.

In the accompanying drawings:

Fig. 1 is a side elevation of a lighting device embodying this invention.

Fig. 2 is a central sectional plan view thereof.

Fig. 3 is a sectional elevation thereof, on line 3—3, Fig. 2.

Fig. 4 is a transverse sectional elevation thereof, on line 4—4, Fig. 3.

Fig. 5 is a fragmentary elevation of the contact part of the base.

In the embodiment of this invention shown by way of example in the drawings, 8 represents the base of the lighting device, which is preferably made of sheet metal and formed to be secured to the side of a vehicle in any suitable manner, for example, by means of screws 9 extending through holes in the base.

The lighting device also includes a lens member 10 which is of hollow, elongated form having an outer face 11 and side walls 12. The side walls are preferably provided with outwardly extending flanges 14 which are formed to enter between cooperating flanges or edge portions 15 of the base 8, these edge portions being provided with inwardly turned parts 16 formed to overhang flanges 14 of the lens member. These flanges extend out from the sides only of the base so that the lens member may be slid into operative relation to the base from an end of the base. The other end of the base may have a slight, outwardly extending flange 19 against which an end wall 17 of the lens member may abut when it is in correct relation to the base. 18 represents a pad of flexible material, such as asphalt impregnated felt, which is secured to the base and forms a gasket between the base and the adjacent edges of the lens member to exclude water and other foreign material from the interior of the lighting device.

The outer wall 11 of the lens member, on its inner surface, is provided with a suitable optical configuration molded therein, such for example as a bulls-eye 20 and a series of substantially annular ridges or rings 21 which serve to project the light from a light bulb to better advantage and, preferably the inner surface of the outer wall of the lens member is also provided with another configuration 22 having the property of reflecting light from an exterior source, so that the lighting device can readily be seen even if the light bulb is not lighted, providing that external light passes to the lens member.

It is very important, of course, that in order to obtain the desired distribution of light to have the light source or lamp filament in the correct relation to the bulls-eye or light refracting rings 21, and in order to accomplish this result, the electric light bulb is mounted on the lens member itself. In the construction shown for this purpose, 25 represents a light bulb, such for example as the type commonly used on automobiles and other motor vehicles, the bulb being mounted in a socket 26 of any usual or suitable construction. The light socket is made of metal and contacts with a metal band on the exterior of the stem of the light bulb 25, and the socket also has the usual middle contact, not herein shown in detail, which contacts with the usual middle portion of the base of the light bulb 25. The socket in the construction shown is mounted in electrical contact with a bracket 28.

In order to assure the correct positioning of the filament of the light bulb so that the same is at all times in correct relation to the lens 20 formed on the inner surface of the wall 11 of the lens member, there is provided within the lens member a support 30, preferably by molding, and the lamp bracket 28 is provided with an arm 31 preferably seated in the recess 32 accurately formed in the supporting member. The arm 28 may be held on the support 30 in any desired manner, for example, by means of a screw 33 which extends into a threaded hole formed in the support 30.

The lens member is preferably made in a single piece of a molded transparent plastic material. By means of such molding, the lens 20 may be very accurately formed and accurately located with reference to the support 30, which is also integral with the lens member. While it is most economical to form the side and end walls of the lens member integral with the outer wall, yet it should be understood that if desired, these walls may be formed separately from the lens member and support 30.

Current may be conducted to the light bulb socket 26 in any suitable or desired manner, for example, by means of conductors terminating at the base 8, and current is conducted from these conductors to the socket when the lens member is in operative relation to the base through contacts on the lens member. For this purpose, the base 8 may be grounded in any suitable or desired manner, not shown, and a conductor 36 ends at a terminal 37 at the base, this terminal being mounted between insulating washers or disks 38 arranged about a hole in the base in any usual or suitable manner, so that the terminal 37 projects to a slight extent beyond the face of the felt or other insulating pad 18 mounted on the base 8. The base 8, which is grounded, is provided with an outwardly extending portion 40 which extends outwardly slightly beyond the outer face of the member 18 through a hole or opening in this member.

In order to make contact with the grounded base 8, any part of the outer portion of the socket 26 may contact with the projection 40 of the base, and in the construction shown by way of example, the bracket 28 is provided with an extension 41 which engages the outwardly projecting part 40 of the base when the lens member is moved into its operative position, as shown in the drawings. This outwardly projecting part is also preferably provided with a slightly raised ridge or substantially V-shaped portion 42 over which the extension 41 of the bracket may ride when moving into its operative position, the bracket 28 being sufficiently resilient to permit this movement of the extension 41. This extension, consequently, serves the two-fold purpose of forming an electrical connection with the base and also holding the lens member in correct relation to the base.

Contact with the end of the conductor 36 may be made by means of an insulated wire 45, one end of which is connected with the usual insulated, central terminal of the socket, and the other end of which is connected to a spring contact member 46 which is mounted on an insulating washer secured on the bracket 28 and soldered to or otherwise connected with the wire or conductor 45. The conductor 45 and the spring contact member 46 are, consequently, suitably insulated from the bracket 28 and the wire 45 extends through a hole in the bracket to the spring contact member 46. When the lens member is in operative relation to the base, this spring contact member will contact with the terminal 37 of the base. Any other means for connecting the terminals on the base with the electrical conductors on the lens member may be provided.

By means of the construction shown, it will be obvious that if the lens member becomes broken or damaged, it can be readily removed from the base by merely sliding the same lengthwise of the base. Also the lens member projects beyond the side of the vehicle to a greater extent than the base, and if the vehicle contacts with an obstruction while moving in a forward direction, the lens member is stripped from the base without damage to the base or to the electrical wiring terminating at the base. Consequently, the lens member may be easily replaced when damaged or lost.

The construction described has the further advantage that it is inexpensive to construct in that the various parts of the lens member can be correctly assembled without skill, since by molding the lens 20 and light bulb support 30 as well as the recess 32 in a single piece of transparent material, the parts of the lens member cannot be incorrectly located relatively to each other.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A lighting device comprising a base and a hollow lens member removably secured to said base, said lens member being of molded transparent material having an exposed light transmitting lens formed integral therewith, said base and lens member being formed with interengaging marginal flanges to retain the lens member on the base, a support formed integral with the line member on the interior thereof and in spaced relation to the lens, a metal bracket secured to the support, a light bulb socket mounted on the bracket and positioned within the lens member to optically align a light bulb therein with the lens, said bracket having electrical contact with the exterior of the socket and also with the base, and a second electrical contact extending from within the socket to said base, said second contact being insulated from the bracket.

2. A lighting device comprising a metal base adapted to be affixed to a supporting wall structure, said base being formed with inturned marginal flanges, a hollow one piece molded transparent lens member mounted on said base, said lens member being formed with outturned marginal flanges interengaging with the flanges on the base to detachably retain the lens member on the base, said lens member also being formed with an exposed lens and a support in the interior of the lens member spaced from said lens, a metal bracket mounted on said support and projecting toward the base and the lens, a lamp socket mounted on the bracket and adapted to hold a lamp bulb in optical alignment with the lens, said bracket having a portion engaging the base to provide a first electrical contact, and a second electrical contact from the socket to a conductor on the base, said second contact and conductor being insulated from the bracket and base.

3. A lighting device as set forth in claim 2, wherein the base is formed with a ridge and the portion of the bracket extending toward the base is resilient and is in engagement with the ridge, thereby to retain the lens member on said base.

4. A lighting device comprising a metal base and a lens member mounted on said base, said lens member comprising a hollow one piece generally elongated formed transparent body having an outer face and side and end walls, said side walls being formed with outturned flanges along the open part of the lens member, said base being formed with inturned flanges to interengage the flanges of the lens member and thereby retain the lens member on the base, said lens member being formed with a lens on the outer face thereof, a support formed integrally with the lens member on the interior thereof and adjacent one of the end walls, a light bulb socket mounted on the support within the lens member and positioned to bring a light bulb therein into optical alignment with the lens, and electrical connections extending from the socket to the base to supply current to a bulb in the socket.

References Cited in the file of this patent

UNITED STATES PATENTS

| | | |
|---|---|---|
| 1,514,457 | Gross | Nov. 4, 1924 |
| 1,613,841 | Monson | Jan. 11, 1927 |
| 1,761,345 | Isackson | June 3, 1930 |
| 2,003,804 | Falge | June 4, 1935 |
| 2,343,598 | Wagner | Mar. 7, 1944 |
| 2,343,754 | Donley | Mar. 7, 1944 |
| 2,605,384 | Adler | July 29, 1952 |
| 2,688,688 | Holtz | Sept. 7, 1954 |